United States Patent [19]

Paradise

[11] Patent Number: 5,362,316
[45] Date of Patent: Nov. 8, 1994

[54] RESINOUS CUT-BACK COMPOSITIONS AND METHODS OF PREPARING THE SAME

[75] Inventor: Richard W. Paradise, Shawnee, Kans.

[73] Assignee: Imperbel America Corporation, Kansas City, Kans.

[21] Appl. No.: 14,341

[22] Filed: Feb. 5, 1993

[51] Int. Cl.$^5$ ............................................. C08L 95/00
[52] U.S. Cl. .................................. 106/278; 106/273.1; 106/276; 106/277; 106/281.1; 106/284; 106/285
[58] Field of Search ................. 106/281.1, 278, 273.1, 106/276, 277, 284, 285

[56] References Cited

U.S. PATENT DOCUMENTS

| | | | |
|---|---|---|---|
| Re. 31,575 | 5/1984 | Ludwig et al. | 106/287.32 |
| 3,737,418 | 6/1973 | Ruckel et al. | 526/281 |
| 3,839,243 | 10/1974 | Ruckel et al. | 525/210 |
| 3,919,181 | 11/1975 | Petersen et al. | 526/90 |
| 3,991,025 | 11/1976 | Kutch et al. | 524/59 |
| 4,052,549 | 10/1976 | Booth | 526/237 |
| 4,169,822 | 10/1979 | Kutch et al. | 525/108 |
| 4,256,506 | 3/1981 | Mendenhall | 106/281.1 |
| 4,290,816 | 9/1981 | Ludwig et al. | 106/287.32 |
| 4,313,986 | 2/1982 | Magnotta | 428/40 |
| 4,338,224 | 7/1982 | Fujii et al. | 523/177 |
| 4,412,864 | 11/1983 | Korashige et al. | 106/284.1 |
| 4,425,453 | 1/1984 | Hunter | 106/232 |
| 4,471,094 | 9/1984 | Uffner et al. | 525/289 |
| 4,654,389 | 3/1987 | Graham et al. | 524/272 |
| 4,670,504 | 6/1987 | Cardenas et al. | 524/504 |
| 4,717,749 | 1/1988 | Tang et al. | 524/271 |
| 4,740,247 | 4/1988 | Hayes et al. | 134/42 |
| 4,755,278 | 7/1988 | Baumgartner | 106/278 |
| 4,755,545 | 7/1988 | Lalwani | 524/64 |
| 4,769,406 | 9/1988 | Keithley | 524/100 |
| 4,824,921 | 4/1989 | Luvinh | 526/237 |
| 4,879,351 | 11/1989 | Schluenz | 525/332.1 |
| 4,959,412 | 9/1990 | Arter et al. | 525/98 |
| 4,994,516 | 2/1991 | Luvinh | 524/275 |
| 5,011,621 | 4/1991 | Sullivan | 252/162 |
| 5,031,648 | 7/1991 | Lutener et al. | 134/32 |
| 5,074,913 | 12/1991 | Trivett | 106/14.34 |
| 5,075,386 | 12/1991 | Vanderbilt | 525/327.3 |
| 5,124,062 | 6/1992 | Stevens | 252/162 |
| 5,164,002 | 11/1992 | Ballenger, Jr. et al. | 106/267 |

FOREIGN PATENT DOCUMENTS 556504  4/1958  Canada ................... 106/278

*Primary Examiner*—Anthony Green
*Attorney, Agent, or Firm*—Kircher, Bowman & Johnson Kokjer

[57] ABSTRACT

A cut-back composition useful for ambient temperature application to substrates comprising a resinous or residue-based component such as asphalt, polymer modified asphalt, coal tar, natural rubber or elastomers and a terpene solvent.

17 Claims, No Drawings

RESINOUS CUT-BACK COMPOSITIONS AND METHODS OF PREPARING THE SAME

BACKGROUND OF THE INVENTION

The present invention relates in general to resinous compositions such as asphalt, coal tar and/or elastomeric compositions, and more specifically, relates to a unique resinous cut-back composition for ambient temperature application to substrates wherein the composition comprises an environmentally safe and biodegradable terpene solvent.

Resinous or residue-based compositions such as those comprising asphalt, polymer modified asphalt, coal tar, natural rubber and elastomers are widely utilized for construction and industrial purposes. Examples of such compositions include hydrocarbon-based sealants, adhesives, cements, mastics, caulking, waterproofing agents, primers and protective aluminum coatings. Such compositions need exhibit good adhesion to the substrates upon which they are applied and should be generally resistant to deterioration over time. The compositions need to have some amount of elasticity and flexibility to avoid cracking and failure when exposed long-term to any number of environmental stresses such as wind, rain or the contraction and expansion of surrounding substrates.

For years these resinous compositions have tended to be solvent blends, also known as "cut-backs", wherein the asphalt or other resinous component is blended with a solvent to increase the fluidity of the composition and enable easy "cold-pour" application at ambient temperatures. The solvent evaporates following application leaving the asphalt residue firmly in place as an adhesive, coating or similar material.

Highly volatile compounds (VOCs) such as aromatic and chlorinated hydrocarbon solvents, including xylene, trichloroethane, toluene, methyl-ethyl ketone and butyl acetate have traditionally been utilized in cut-back formulations. These solvents have proven useful since they readily evaporate following application to leave a relatively dry adherent residue in a short amount of time. Yet due to the potentially carcinogenic, toxic and high VOC character of many aromatic and chlorinated hydrocarbon solvents, the use of such solvents for construction and industrial purposes is now closely scrutinized by the Occupational Safety and Health Administration (OSHA). Furthermore, these solvents are the subject of stringent hazardous chemical regulations because they are highly volatile, not readily biodegradable and are photochemically reactive. Another disadvantage of using such solvents is that some construction materials, such as roofing membranes for example, can be damaged by intimate contact with these strong solvents.

In view of the environmental, health and quality concerns heretofore described, less dangerous solvents such as mineral spirits have been used to provide resinous cut-back compositions. The mineral spirits is less toxic and volatile than solvents used in the past, and therefore release a smaller amount of VOCs into the environment. Although the reduced volatility is preferred for environmental and safety reasons, the mineral spirits evaporates slowly over a long period of time which detracts from the overall effectiveness of the composition. For instance, when applying an adhesive, a slower evaporation time delays set-up of the composition and inhibits complete bonding between joined surfaces. As a result of this extended drying period, the construction has poor wind resistance or is otherwise vulnerable to environmental factors.

To eliminate these drawbacks, some asphalt or modified asphalt compositions are provided as "hot-melt" compositions. The "hot-melts" are prepared by heating the asphalt to relatively high temperatures in excess of 300° F. and applying the composition while hot. The composition is fluid at such high temperatures enabling application of the composition without the need for volatile and dangerous solvents. Although these "hot-melt" compositions are readily used commercially, they require heating equipment, such as oil jacketed double boilers with oil being used as the heating medium, at the work site. Another problem associated with the use of these heaters and hot asphalt materials is the risk of fire and accidental burn injuries. In addition, careful control of the heating of the heat transfer oil and of the hot-melt composition must be exercised to prevent overheating. Even with proper heating control, the physical characteristics of these rubbery compositions, such as elasticity and resilience, can often be reduced by thermal degradation which accompanies high temperature maintenance for relatively long periods of time.

It is therefore an object of the present invention to provide a resinous composition that is both environmentally safe and that can be applied at ambient temperatures.

A further object of the present invention is to provide a resinous composition which sets-up to provide a resistant and otherwise strong bond in a relatively short period of time following application.

Another object of the present invention is to provide a resinous or residue-based composition that comprises a relatively high amount of solids to minimize shrinkage following application.

Still another object of the present invention is to provide a resinous composition that avoids the use of dangerous highly volatile organic chemicals which pose an environmental threat and expose the applicator to health risks.

It is a further object of the present invention to provide a resinous or residue-based composition that contains a biodegradable solvent which exhibits relatively low toxicity and non-corrosiveness.

Yet another object of the present invention is to provide a resinous composition which comprises a solvent that has a relatively low-level or minimal VOC release.

Still a further object of the present invention is to provide a resinous composition comprising a solvent that is not photo-chemically reactive as to destroy or otherwise effect the ozone layer.

It is another object of the present invention to provide a resinous composition that can be easily handled and applied without special heating equipment.

Another object of the present invention is to provide a resinous or residue-based composition that does not deteriorate over time and does not destroy or alter construction materials used therewith.

It is another object of the present invention to provide a resinous composition that exhibits good elasticity, stress relaxation, superior bond and adhesion to substrates even at relatively low temperatures.

A further object of the present invention is to provide a method for preparing a resinous composition meeting all of the above and foregoing objects.

SUMMARY OF THE INVENTION

These and other objects of the present invention are achieved by a resinous cut-back composition useful for "cold pour" application, wherein the composition comprises a terpene solvent. The terpenes are naturally occurring, biodegradable compounds which are characterized by a very low level release of VOCs. Unlike some of the aromatic and chlorinated hydrocarbon solvents that have been used for cut-back formulations in the past, the terpenes do not exhibit photo-reactivity that can damage the ozone and do not destroy or otherwise alter the quality of construction materials upon which the solvent comes into contact. Thus, compositions made in accordance with the present invention are relatively non-toxic, environmentally safe and result in an overall superior product.

Of particularly interest, resinous compositions made in accordance with the present invention set-up or preliminarily dry in a relatively rapid manner to provide a wind resistant and otherwise strong bond. The terpene solvent is capable of solubilizing asphalt, modified asphalt, elastomer or other resinous additives to provide a composition having a relatively high solids content up to 90% by weight of the total composition. Thus, the resinous composition made in accordance with the present invention can be poured for uniform application at ambient temperatures, while comprising a sufficiently high percentage of solids to avoid shrinkage following evaporation of the solvent.

DETAILED DESCRIPTION OF THE INVENTION

The asphalt-based composition of the present invention is characterized by the presence of a terpene solvent that is capable of solubilizing resinous or residue-like components to provide a uniform composition for application to substrates at ambient temperatures. Terpene compounds that are suitable for this purpose include but are not limited to pinshe, both the alpha and beta isomers; gamma terpinene; delta-3-carene; limonene, both the l and d isomers; methadiene; and dipentene (the racemic mixture of the isomers of optically active limonene).

In a preferred embodiment, the composition comprises limonene, dipentene and/or mixtures thereof. Limonene is a natural product in various ethereal oils such as oils of lemon, orange, caraway, dill and bergamot which possesses a citrus-like odor and is found in commercial quantities in citrus fruits. Dipentene is found in large quantity in pine trees and has a distinct pine scent. Terpene solvents in accordance with the present invention are available commercially from Arizona Chemical Company of Panama City, Fla. under the trademark ACINTENE ®"LS" series.

The terpene may also be combined or blended with other solvents, such as mineral spirits, to lower the overall VOC character of the composition and to facilitate early set-up of the composition following application. The total amount of solvent provided in the cut-back composition will vary depending upon the nature of the composition prepared, but will generally range from 5 to 70%, preferably 10 to 55% and most preferably ranges from 15 to 35% by weight of the total composition. The remainder of the composition comprises a resinous component in an amount ranging from 25 to 90% of the total composition and preferably ranging from 30 to 85% of the composition. Optional fillers, gellants, surfactants, pigmenting agents and other additives may additionally be included.

The cut-back composition of the present invention may comprise any resinous component now known or later developed in the art as a base material for coatings, waterproofing compositions, paints, sealants, adhesives, cements, caulking and the like. Suitable resinous components include asphalt, polymer modified asphalt, coal tar, natural rubber and synthetic elastomers. The important ingredient of the present composition is the terpene solvent as heretofore described. Thus any known resinous or residue-based cut-back formulation and method of preparing the same is considered suitable for purposes of the present invention, whereby a terpene is substituted in whole or in part as the solvent.

In the preparation of asphalt-based adhesives, cements and coatings, the resinous component may include any known asphalt material including straight asphalts such as those typically used for road paving, repair and maintenance purposes; oxidized or blown asphalts and asphalt fluxes which are commonly used in roof coatings and waterproofing applications; and steam reduced asphalts frequently utilized in roofing saturates and road oil. A particularly suitable material for these purposes includes asphalt generally used in road paving and asphalt flux. A commercially available asphalt for use in the present invention is sold under the product name AC 20 by Koch Industries, Inc. of Wichita, Kansas.

The resinous component of the present composition may additionally include natural rubbers or synthetic elastomers. Particularly suitable elastomers include blends prepared by the copolymerization of one or more conjugated dienes, such as butadiene, isoprene, and chloroprene with one or more ethylenic monomers such as styrene. Useful blends in the preparation of adhesives and cement compositions include styrene butadiene rubber (SBR) and styrene-butadiene-styrene block copolymer (SBS). These elastomers or similar materials may be blended with asphalt materials or may be used alone as the resinous component.

Compositions made in accordance with the present invention may additionally employ gelling and thickening agents such as fumed silica blended with ethylene glycol, amine acetate and attapulgite clay mixtures, amide and bentonite clay blends and mixtures thereof to provide the desired texture and body for ease of application. Fillers and stabilizers such as organic and inorganic fibers, stone dust, limestone, sand, talc and mixtures thereof may also be included. In addition, aluminum-based paints and coatings will include an amount of aluminum dust or flakes as known in the art.

Having thus generally described the present invention, the following examples are set forth below to further demonstrate compositions embodying the present invention:

COMPOSITION A

Asphalt Based Roofing Membrane Adhesive

This is a homogeneous mixture of 50 to 70% by weight of asphalt flux, 15 to 20% of a terpene solvent, 3.5–6% of a gelling agent, 0 to 3% of styrene-butadiene-styrene block co-polymer, 1 to 3% of cellulose fibers and 20 to 30% of calcium carbonate. This material has a viscosity at 77° F. ranging from about 30,000 to 50,000 centipoise (cps). Certain roofing constructions using this adhesive have passed the Factory Mutual (FM)

4470 Wind Uplift Pressure Test of Roof Coverings following thirty (30) days after application.

COMPOSITION B

Asphalt Based Roof Cement

This is a homogeneous mixture of 40 to 60% by weight of asphalt flux, 10 to 20% of a terpene solvent, 3 to 14% of a gelling agent, 0 to 3% of styrene-butadiene-styrene block co-polymer, 3 to 6% of cellulose fibers and 20 to 40% of calcium carbonate. This composition generally satisfies ASTM D2822, Type I, Class I and has a viscosity at 77° F. ranging from 150,000 to 250,000 cps.

COMPOSITION C

Non-Fibered Aluminum coating

This is a homogeneous mixture of 30 to 40% by weight of oxidized asphalt, 35 to 45% of a terpene solvent, 15 to 25% of aluminum flake, 0 to 3% of styrene-butadiene-styrene block copolymer and 5 to 10% of talc. This composition generally satisfies ASTM D2824, Type I and has a viscosity at 77° F. ranging from 20 to 30 Stormer s-100 revolutions with a paddle type rotor and a 100 gram (g) load in addition to the standardizing load.

COMPOSITION D

Fibered Aluminum Coating

This is a homogeneous mixture of 40 to 50% by weight of asphalt flux, 25 to 35% of a terpene solvent, 15 to 20% of aluminum flake, 0 to 3% of styrene-butadiene-styrene block co-polymer, 5 to 10% of talc, and 1 to 2% of cellulose fibers. This composition generally satisfies ASTM D2824, Type III and has a viscosity at 77° F. ranging from 15 to 90 Stormer s-100 revolutions with a propeller type rotor and a 300 gram (g) load in addition to the standardizing load.

COMPOSITION E

Asphalt-Based Primer/Foundation Coating

This is a homogeneous mixture of 50 to 70% by weight of asphalt flux and 30 to 50% of a terpene solvent. This composition generally satisfies ASTM D41 and has a viscosity at 77° F. ranging from 25 to 125 seconds (s) Saybolt Furol Test.

COMPOSITION F

Automotive Underbody Coating

This is a homogeneous mixture of 50 to 70% by weight of asphalt flux, 15 to 25% of a terpene solvent, 2 to 7% of a gelling agent, 0 to 3% of styrene-butadiene-styrene block co-polymer, 2 to 6% of talc and 2 to 6% of cellulose fiber.

The above-compositions can be prepared by heating the resinous components, including the asphalt and elastomer materials, to a temperature ranging from 150° to 325° F. with about 200° to 250° being preferred. The temperature of the resinous component is then reduced slightly to maintain a constant temperature up to about 150° F. In a Lightening TM type or propeller mixer, the terpene solvent is added to the hot resinous material and blended until the composition is uniform. The viscosity of the resulting composition at ambient temperatures will vary depending upon the amount of solvent added. Once the resinous component and the solvent are well blended, the compositions may then be transferred to a paddle or ribbon-type blender where the gelling and thickening agents, fillers, aluminum and other additives are added.

Compositions made in accordance with the present invention exhibit good weather resistance and readily adhere to the intended substrate even in relatively cold weather. The compositions set-up quickly and the construction materials show no signs of deterioration or other failure resulting from intimate contact with the terpene solvents. Since the compositions generally have a relatively high solids content, adhesion is enhanced and shrinkage is minimized.

From the foregoing, it will be seen that this invention is one well adapted to attain all the ends and objects hereinabove set forth together with other advantages which are obvious and which are inherent to the composition.

It will be understood that certain features and subcombinations are of utility and may be employed without reference to other features and subcombinations. This is contemplated by and is within the scope of the claims.

Since may possible embodiments may be made of the invention without departing from the scope thereof, it is to be understood that all mater herein set forth or shown in the examples is to be interpreted as illustrative and not in a limiting sense.

Having thus described the invention, I claim:

1. A cut-back composition for ambient temperature application to substrates comprising a resinous component selected from the group consisting of asphalt, coal tar, and mixtures thereof, and a terpene solvent, wherein said terpene solvent is present in said composition in an amount ranging from 5%–70% by weight of the total composition.

2. A composition according to claim 1, wherein said terpene solvent is selected from the group consisting of pinene (the alpha and beta isomers), gamma terpinene, delta-3-carene, limonene (the l and d isomers), methadiene, dipentene and mixtures thereof.

3. A composition according to claim 2, wherein said terpene solvent is selected from the group consisting of limonene, dipentene and mixtures thereof.

4. A composition according to claim 1, wherein said terpene solvent is present in said composition in an amount ranging from 10 to 55% by weight of the total composition.

5. A composition according to claim 4, wherein said terpene solvent is present in said composition in an amount ranging from 15 to 35% by weight of the total composition.

6. A composition according to claim 1, wherein said asphalt is selected from the group consisting of straight asphalts, oxidized or blown asphalts, asphalt fluxes, steam reduced asphalts polymer modified asphalts and mixtures thereof.

7. A composition according to claim 1, wherein said resinous component is provided in said composition in an amount ranging from 25 to 90% of the total composition.

8. A composition according to claim 7, wherein said resinous component is provided in said composition in an amount ranging from 30 to 85% of the total composition.

9. A composition according to claim 1, wherein said composition additionally includes other solvents, said other solvents being selected from the group consisting of non-aromatic solvents, aromatic solvents, and mixtures thereof.

10. A composition according to claim 1 wherein said composition additionally includes other solvents, said other solvents being selected from the group consisting of chlorinated hydrocarbon solvents.

11. A composition according to claim 1, wherein said composition additionally includes other solvents, said other solvents being selected from the group consisting of xylene, trichloroethane, toluene, methyl-ethyl ketone, butyl acetate, mineral spirits and mixtures thereof.

12. A composition according to claim 11, wherein said other solvents is selected from the group consisting of mineral spirits.

13. A composition according to claim 1, wherein said composition additionally includes organic and inorganic fillers and stabilizers.

14. A composition according to claim 13, wherein said fillers and stabilizers are selected from the group consisting inorganic and organic fibers, stone dust, limestone, sand, talc and mixtures thereof.

15. A composition according to claim 1 wherein said composition additionally includes gelling and thickening agents.

16. A composition according to claim 15, wherein said gelling and thickening agents are selected from the group consisting of fumed silica blended with ethylene glycol, amine acetate and attapulgite clay mixtures, amide and bentonite clay blends and mixtures thereof.

17. A composition according to claim 1, wherein said composition additionally includes aluminum.

* * * * *